US008001080B2

(12) United States Patent
Gupta et al.

(10) Patent No.: US 8,001,080 B2
(45) Date of Patent: Aug. 16, 2011

(54) MANAGING REAL-TIME EXECUTION OF TRANSACTIONS IN A NETWORK

(75) Inventors: Puneet Gupta, Bangalore (IN); Zalak Jitendra Dedhia, Mumbai (IN); Kavitha Damodhiran, Peelamedu-Coimbatore (IN); Rajat Laxmichand Gogri, Mumbai (IN)

(73) Assignee: Infosys Technologies Ltd., Bangalore (IN)

( * ) Notice: Subject to any disclaimer, the term of this patent is extended or adjusted under 35 U.S.C. 154(b) by 362 days.

(21) Appl. No.: 11/854,428

(22) Filed: Sep. 12, 2007

(65) Prior Publication Data
US 2008/0065648 A1 Mar. 13, 2008

(30) Foreign Application Priority Data

Sep. 12, 2006 (IN) ............................ 1653/CHE/2006

(51) Int. Cl.
*G06F 7/00* (2006.01)
*G06F 17/00* (2006.01)

(52) U.S. Cl. ........................................ 707/617; 707/620

(58) Field of Classification Search .................... 707/10, 707/617, 620
See application file for complete search history.

(56) References Cited

U.S. PATENT DOCUMENTS

| | | | | | |
|---|---|---|---|---|---|
| 5,991,771 | A | * | 11/1999 | Falls et al. | 707/999.202 |
| 6,108,583 | A | * | 8/2000 | Schneck et al. | 700/9 |
| 6,115,690 | A | * | 9/2000 | Wong | 705/7 |
| 6,240,426 | B1 | * | 5/2001 | Beyda et al. | 707/617 |
| 6,298,072 | B1 | * | 10/2001 | Koliczew | 370/503 |
| 6,332,163 | B1 | * | 12/2001 | Bowman-Amuah | 709/231 |
| 6,633,924 | B1 | * | 10/2003 | Wu et al. | 719/328 |
| 6,976,074 | B2 | * | 12/2005 | Cabrera et al. | 709/227 |
| 7,089,208 | B1 | * | 8/2006 | Levchin et al. | 705/39 |
| 7,143,093 | B1 | * | 11/2006 | Bracho et al. | 1/1 |
| 7,206,796 | B2 | * | 4/2007 | Hansen et al. | 707/620 |
| 7,359,920 | B1 | * | 4/2008 | Rybicki et al. | 707/617 |
| 7,478,062 | B2 | * | 1/2009 | Ansley | 705/35 |
| 7,657,486 | B2 | * | 2/2010 | Smets et al. | 705/41 |
| 7,743,024 | B2 | * | 6/2010 | Mandre et al. | 707/620 |
| 7,809,685 | B2 | * | 10/2010 | Wolff | 707/648 |
| 7,890,646 | B2 | * | 2/2011 | Khosravy et al. | 709/231 |

(Continued)

OTHER PUBLICATIONS

Rollman and Schneider, "Mobile Web Services, The Foundation for Occasionally Connected Computing," *XML 2004 Proceedings by SchemaSoft*, 10 pages (Nov. 2004).

(Continued)

*Primary Examiner* — Yicun Wu
*Assistant Examiner* — Pavan Mamillapalli
(74) *Attorney, Agent, or Firm* — Klarquist Sparkman, LLP

(57) ABSTRACT

Real-time execution of transactions can be managed between network devices. A method for managing real-time execution of transactions can comprise receiving one or more transactions, storing details associated with the one or more transactions, and synchronizing the details from a first network device to a second network device. Synchronizing details can comprise checking network connectivity between devices. Synchronization middleware can comprise a command engine, a synchronization engine, and a request-response engine. Synchronization middleware can be configured to process transactions, comprising checking network connectivity and determining whether transactions have expired. A method for managing real-time execution of transactions can comprise receiving real-time transactions from applications running on a network device, determining whether a network connection to a second network device is operational, if the connection is operational synchronizing the transactions, and if the connection is not operational delaying synchronization.

12 Claims, 10 Drawing Sheets

U.S. PATENT DOCUMENTS

| | | | |
|---|---|---|---|
| 2002/0147668 A1* | 10/2002 | Smith et al. | 705/30 |
| 2003/0154406 A1* | 8/2003 | Honarvar et al. | 713/201 |
| 2004/0030789 A1* | 2/2004 | Gupta et al. | 709/230 |
| 2004/0073640 A1* | 4/2004 | Martin et al. | 709/223 |
| 2004/0088408 A1* | 5/2004 | Tsyganskiy | 709/225 |
| 2005/0050142 A1* | 3/2005 | Capone et al. | 709/204 |
| 2007/0100773 A1* | 5/2007 | Wallach | 705/75 |

OTHER PUBLICATIONS

Hill et al., "Prescriptive Architecture, Chapter 4—Occasionally Connected Smart Clients," *MSDN*, <msdn2.microsoft.com/en-us/library/ms998482(d=printer).aspx>, 16 pages (Jun. 2004).

Fineberg "The Occasionally Connected Computing (OCC) Model,"<adobe.com/devnet/central/articles/occ_whitepaper/occ_whitepaper.pdf>, 8 pages (accessed Sep. 5, 2007).

Padmanabhuni et al., "Adding Reliability to Occasionally Connected Computing in Mobile Devices," *SOA World Magazine*, <webservices.sys-con.com/read/204433.htm>, 17 pages (Apr. 17, 2006).

Butrico et al., "Gold Rush: Mobile Transaction Middleware with Java-Object Replication," *Proceedings of the Third USENIX Conference on Object-Oriented Technologies and Systems (COOTS)*, Portland, Oregon, pp. 91-101 (Jun. 16-19, 1997).

\* cited by examiner

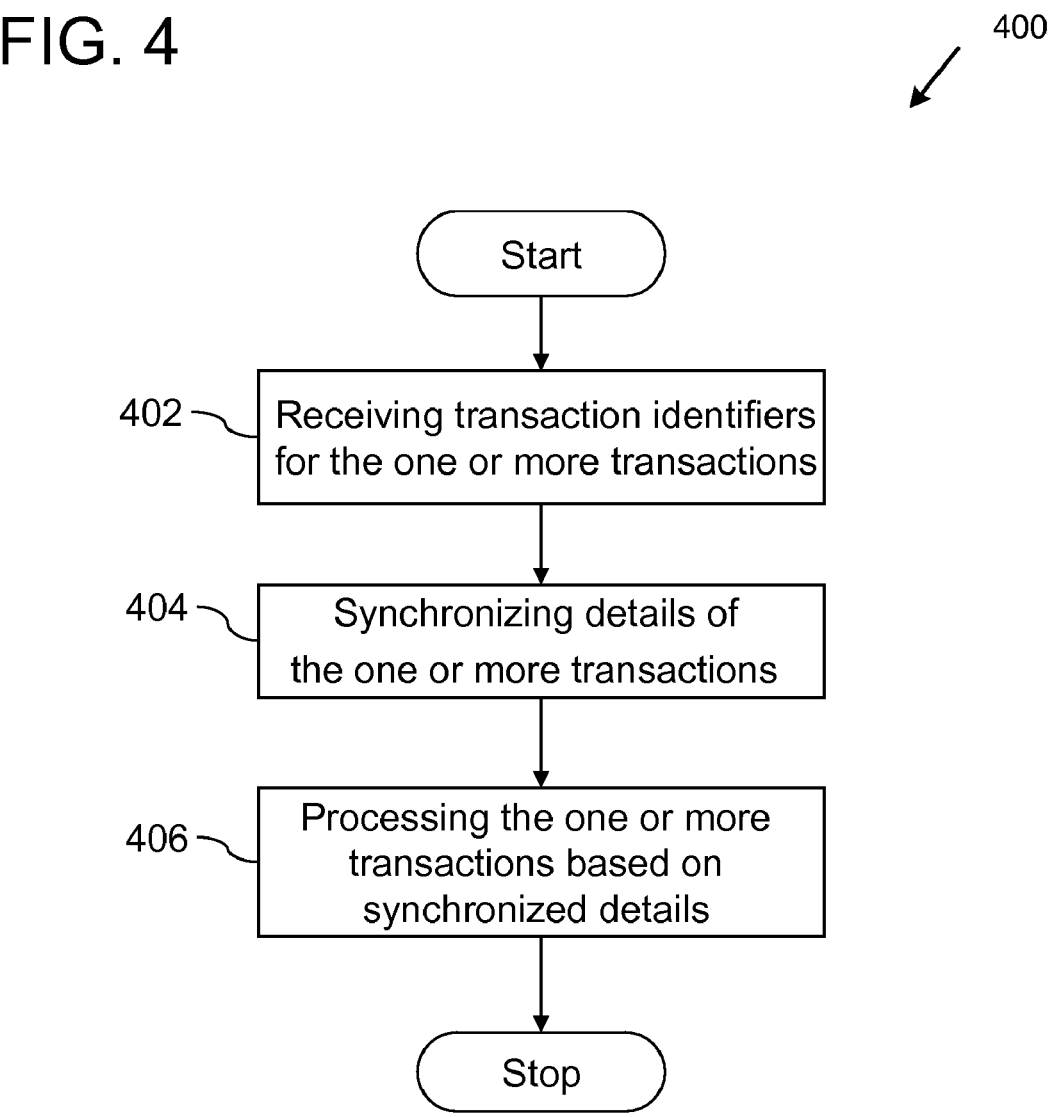

SOFTWARE 880 FOR TECHNOLOGY
DESCRIBED IN EXAMPLE(S)

MANAGING REAL-TIME EXECUTION OF TRANSACTIONS IN A NETWORK

BACKGROUND

With the growth of wireless technology, various applications are being developed for network devices, which need to continuously synchronize their data with the server. The synchronization is performed by replicating the data from the server on to network devices, and vice versa. However, to be in sync with the server, applications need to stay connected all the time. Usually network devices move in and out of the connectivity network, resulting in loss in connectivity of the applications. This loss in connectivity results in incomplete synchronization of data or termination of transactions.

Various methods are available that solve the occasional network connection problems. One such method is integrating an acknowledgement request with the data. The acknowledgement request is sent back to the sender if connectivity is available and the data is replicated successfully. If the acknowledgement is not received, the data is replicated again. However, integration of the acknowledgement request with data is not efficient with transactions requiring real-time execution.

In light of the above discussion, there is a need for managing real-time transactions between network devices.

SUMMARY

In summary, the detailed description is directed to various techniques and tools for managing real-time transactions in an occasionally connected computing network.

One aspect of the techniques and tools described herein is directed to managing real-time execution of transactions between requesting applications and server applications executing on a plurality of network devices. Another aspect is directed to masking network connectivity problems from the requesting applications and the server applications. Yet another aspect is directed to providing a secure connection between network devices.

Various implementations are directed to methods, systems, and computer program products (e.g., computer readable media) for managing real-time execution of transactions between network devices (e.g., between a plurality of network devices). The network devices include one or more requesting applications and one or more server applications. One or more transactions (e.g., real-time transactions) are conducted between the requesting applications and the server applications. Further, one or more middleware are installed on the network devices. The middleware is associated with the requesting applications and the server applications, and is used to synchronize the details of the transactions between the applications. In a specific embodiment, the details of the transactions include one or more of the transaction identifier, the state of the transaction, the time of expiry, the security preference, the configuration details, the server application details, and the like. The synchronization masks occasional network disconnects from the requesting applications and the server applications. At a time of network connectivity, the transactions are processed, based on the synchronized details.

The foregoing and other features and advantages will become more apparent from the following detailed description, which proceeds with reference to the accompanying figures.

BRIEF DESCRIPTION OF THE DRAWINGS

FIG. 4 is a flowchart for managing real-time execution of one or more transactions.

DETAILED DESCRIPTION OF EXEMPLARY EMBODIMENTS

Various implementations are directed to methods, systems, and computer program products (e.g., computer readable media) for managing real-time execution of transactions between network devices (e.g., between a plurality of network devices). The network devices may include one or more requesting applications and server applications. More specifically, the transactions can be carried out between the requesting applications and the server applications. The requesting applications and the server applications can interact with each other in a network through one or more middleware. The middleware synchronizes the transactions between the applications in real-time. The synchronization of the transactions masks the occasional network disconnects from the requesting applications and the server applications.

Figure 1:
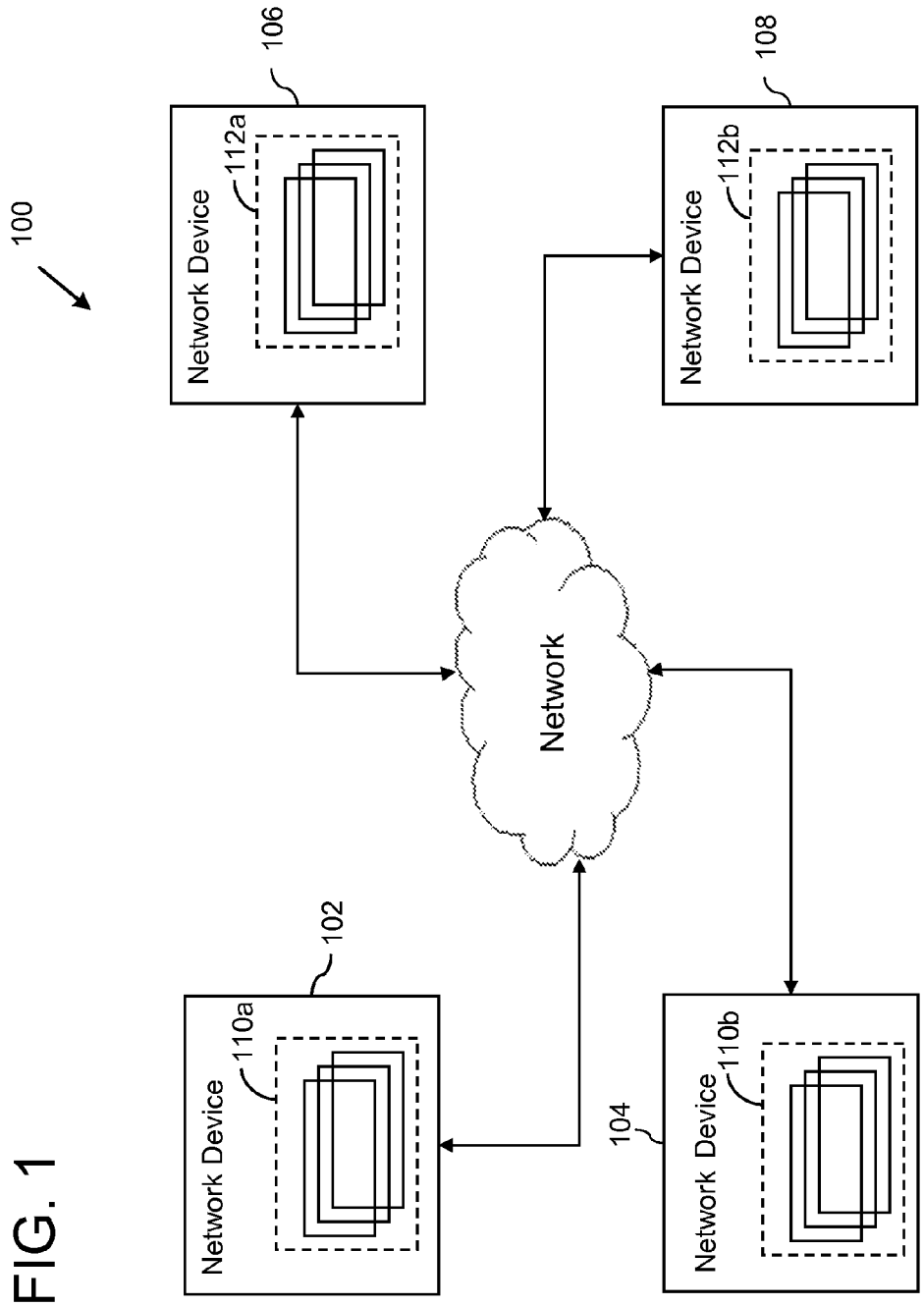
FIG. 1 illustrates an environment in which various embodiments may be practiced.

FIG. 1 illustrates a network 100 in which various embodiments may be practiced. Network 100 includes a network device 102, a network device 104, a network device 106, and a network device 108, hereinafter, referred to as a plurality of network devices. A network device may be a mobile phone, a computer, a Personal Digital Assistant (PDA), or any other type of computing device capable of participating in transactions (e.g., real-time transactions) via a network (e.g., a computing network). Network device 102 and network device 104 include one or more requesting applications 110, such as requesting applications 110a and requesting applications 110b. Network device 106 and network device 108 include server applications 112, such as server applications 112a and server applications 112b. Requesting applications 110 conduct one or more transactions with server applications 112 through network 100.

In various embodiments, network 100 may be a wired or wireless network. Examples of network 100 include, but are not limited to, a Local Area Network (LAN), a Metropolitan Area Network (MAN), a Wide Area Network (WAN), a mobile phone network, the Internet, and various combinations of networks. In various embodiments, the plurality of network devices communicate over network 100 using various protocols, such as Bluetooth, Wi-Fi, Zigbee, IEEE 802.11, Radio Frequency Identification (RFID), Dedicated Short Range Communications (DSRC), combinations of these networks, or the like. Examples of requesting applications 110 include, but are not limited to, gaming applications, search applications, shopping applications, and various utility applications. Examples of server applications 112 include, but are not limited to, gaming server applications, database server applications, shopping applications, and utility server applications.

Figure 2:
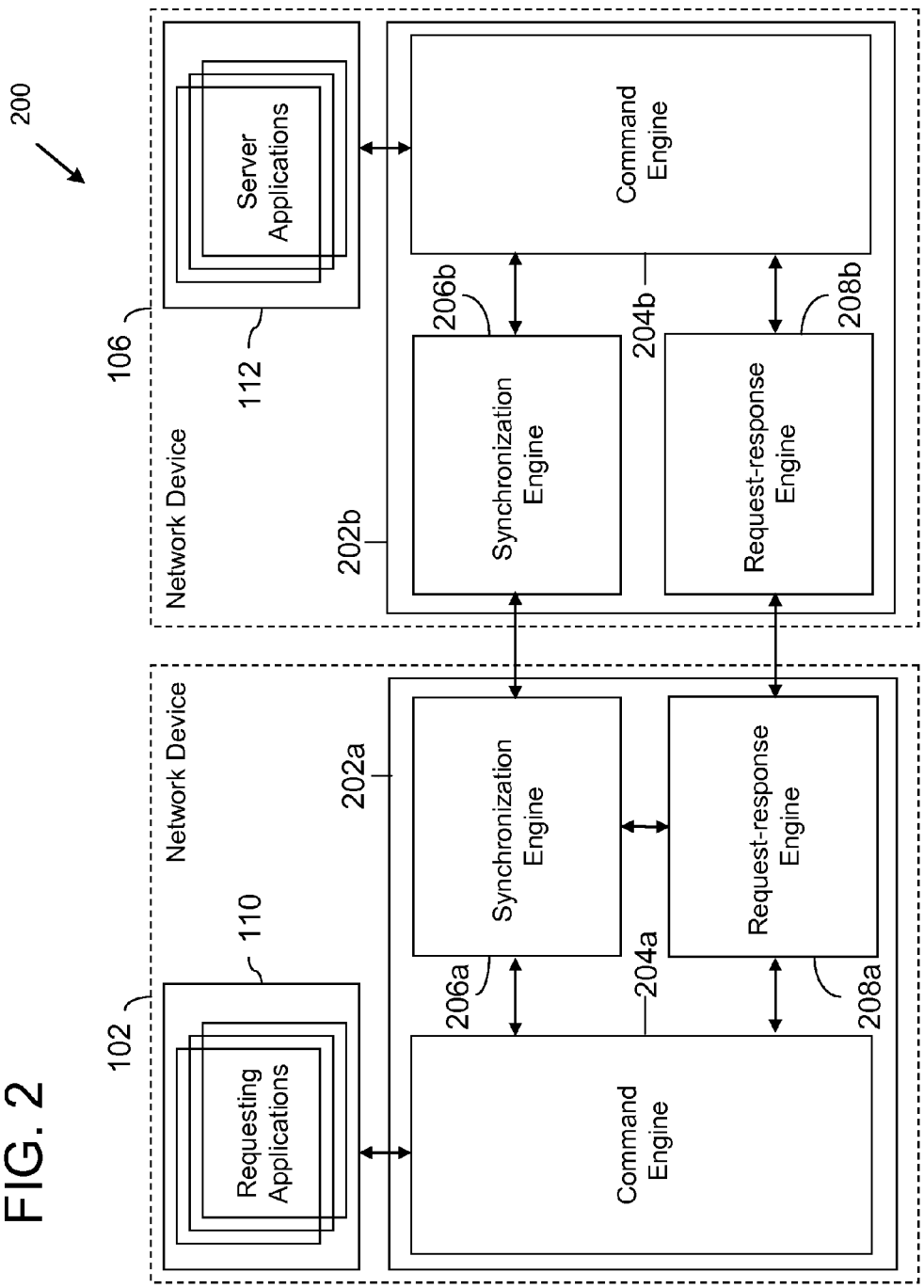
FIG. 2 is a block diagram of a system for managing real-time execution of one or more transactions, in accordance with an exemplary embodiment.

FIG. 2 is a block diagram of a system 200 for managing real-time execution of one or more transactions (e.g., real-time transactions) between network device 102 and network device 106, in accordance with an exemplary embodiment. System 200 includes a middleware 202a and a middleware 202b. Middleware 202a and middleware 202b are present on network device 102 and network device 106, respectively. Moreover, middleware 202a and 202b are configured to manage transactions between network devices 102 and 106. Middleware 202a includes a command engine 204a, a synchronization engine 206a and a request-response engine 208a. Further, middleware 202b includes a command engine 204b, a synchronization engine 206b and a request-response engine 208b.

Command engines 204a and 204b are configured to receive one or more transaction identifiers from the plurality of network devices, such as network device 102 and network device 106. In a specific embodiment, the transaction identifiers are transaction requests or transaction responses that are received from requesting applications 110 and server applications 112, respectively. In a specific embodiment, command engines 204a and 204b assign one or more transaction identifiers to the transaction requests or transaction responses received from the plurality of network devices. In a specific embodiment, the transaction identifiers uniquely identify the one or more transactions.

Synchronization engines 206a and 206b are configured to synchronize the details of the transactions on to the plurality of network devices in real-time. A transaction is said to be executed in real-time if a transaction response is received before the time of expiry for that transaction (e.g., the transaction expiration time). In a specific embodiment, synchronization engine 206a synchronizes the details of the transactions on to middleware 202b present on network device 106 in real-time. The details of the transactions may include the transaction identifiers, the state of the transactions, the time of expiry, the security preferences, the configuration details, the server application details, and the like. The state of the transactions includes temporary parameters, data, and variables associated with the transactions. The time of expiry determines the validity of a transactions request, for which a response corresponding to the request is valid. Further, the security preferences define the encryption details for transmitting the transactions.

Request-response engines 208a and 208b are configured to process the transactions based on the synchronized details of the transactions. In various embodiments, the synchronized details are compared with the earlier synchronized details each time the synchronization takes place, to determine the new and updated transaction identifiers. Request-response engines 208a and 208b, upon synchronized details being updated, process the new and updated transactions. In a specific embodiment, request-response engines 208a and 208b process the transactions with requesting applications 110 and server applications 112, irrespective of the network connectivity between the plurality of network devices.

In various embodiments, different elements of system 200, such as command engines 204a and 204b, synchronization engines 206a and 206b, request-response engines 208a and 208b, may be implemented in the form of hardware, software, firmware, or combinations thereof.

Figure 3:
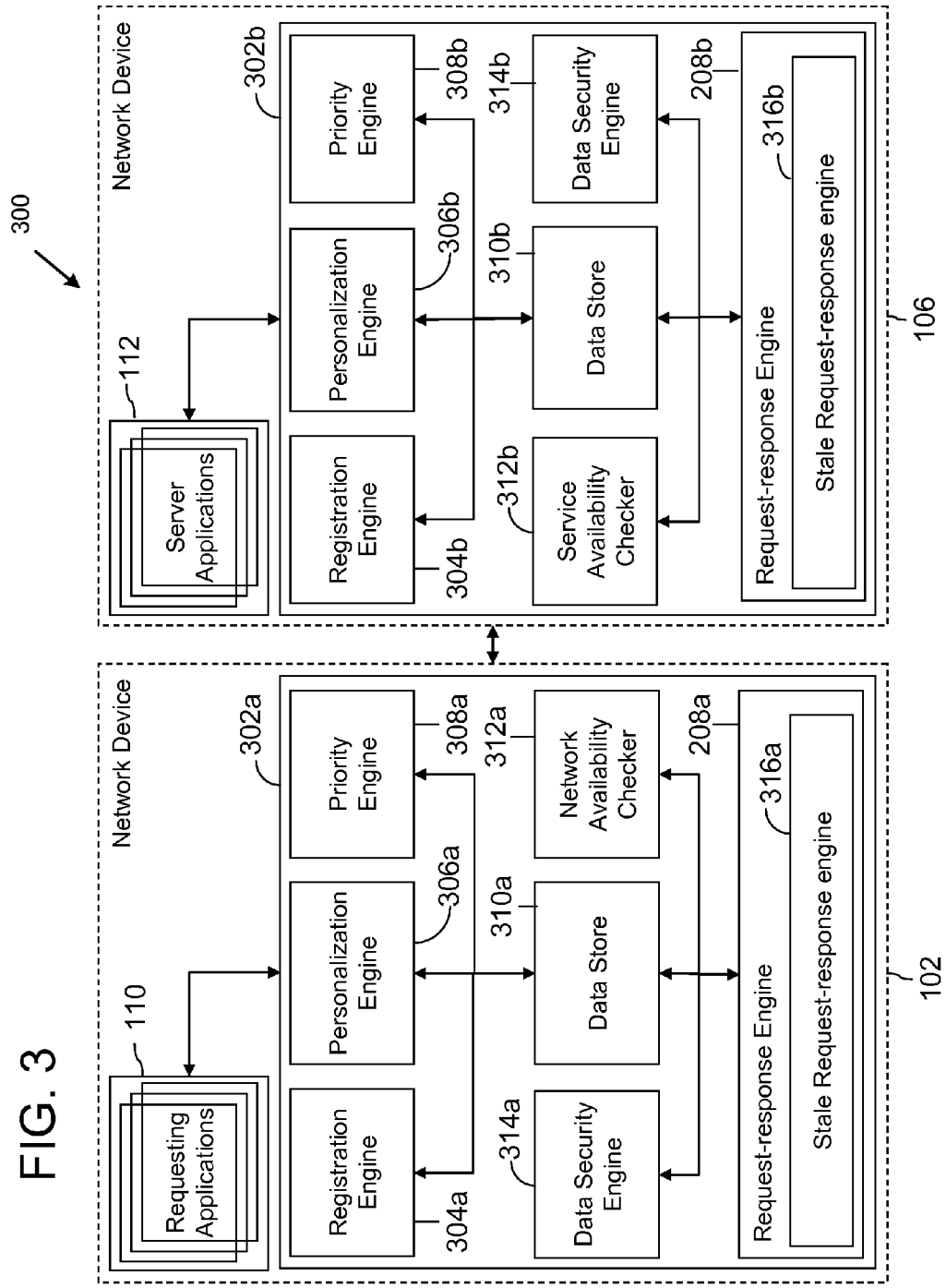
FIG. 3 is a block diagram of a system for managing real-time execution of one or more transactions, in accordance with another exemplary embodiment.

FIG. 3 is a block diagram of a system 300 for managing real-time execution of one or more transactions (e.g., real-time transactions) between network device 102 and network device 106. System 300 includes a middleware 302a and a middleware 302b. Middleware 302a and middleware 302b are present on network device 102 and network device 106, respectively. Moreover, middleware 302a and 302b are configured to manage transactions between network devices 102 and 106. Middleware 302a includes a registration engine 304a, a personalization engine 306a, a priority engine 308a, a data store 310a, a network availability checker 312a, a data security engine 314a, command engine 204a (not shown in FIG. 3), synchronization engine 206a (not shown in FIG. 3), and request-response engine 208a. Middleware 302b includes a registration engine 304b, a personalization engine 306b, a priority engine 308b, a data store 310b, a service availability checker 312b, a data security engine 314b, command engine 204b (not shown in FIG. 3), synchronization engine 206b (not shown in FIG. 3), and request-response engine 208b. Further, request-response engine 208a and 208b includes stale request-response engines 316a and 316b, respectively.

Registration engine 304a registers requesting applications 110 with middleware 302a. Similarly, registration engine 304b registers server applications 112 with middleware 302b.

Personalization engines 306a and 306b define personalization details, such as the state of the application, the configuration of the application, the time of expiry, the number of retransmissions, and security preference associated with the transaction requests and responses. In a specific embodiment, personalization engines 306a and 306b associate one or more time periods, such as a time of expiry (e.g., expiration time(s)), with requesting application 110 and server application 112. The time of expiry determines the validity of the transaction request and the transaction response associated with requesting applications 110 and server applications 112. In various embodiments, a global time of expiry may also be associated with requesting applications 110 and server applications 112. The global time of expiry determines the validity of all the transaction requests and responses (e.g., all the transactions on middleware 302a and middleware 302b expire on the expiry of this global time period). The global time of expiry is used to notify the applications, if network connectivity is not available for a long time. The applications are notified about the network disconnection if the disconnection time exceeds the global time of expiry. In a specific embodiment, the global time of expiry is used for determining the validity of transactions that do not have a time of expiry associated with them.

Priority engines 308a and 308b assign priorities to requesting applications 110 and server applications 112, respectively. A transaction associated with an application with a higher priority is given preference over the transactions of another application with a lower priority. In a specific embodiment, priority engines 308a and 308b assign priorities based on the time of expiry of requesting applications 110 and server applications 112. For example, an application with a shorter time of expiry is given a priority over another application with a longer time of expiry.

Data store 310a and 310b store the details of the transactions. Examples of the details may include, but are not limited to, personalization details, transaction identifiers, priorities, and configuration details associated with the applications and their corresponding transactions.

Network availability checker 312a checks the network connectivity between network device 102 and network device 106. If the network connection is unavailable, request-response engines 204a and 204b maintain a queue of transaction requests and responses based on various time periods. However, if the network connection is available, synchronization engine 206a synchronizes the details stored in data store 310a with synchronization engine 206b in real-time, and vice versa. In a specific embodiment, synchronization engine 206a synchronizes details stored in command engine 204a and command engine 204b. Synchronization of details includes replicating the details of the transaction requests and responses on to middleware 302b and 302a, respectively.

Data security engines 314a and 314b encrypt the details of the transactions and maintain a secure connection between network device 102 and network device 106. Examples of the types of encryption that can be used include Transport Layer Security (TLS), Secure Sockets Layer (SSL), HTTPS, SSH, and the like. In a specific embodiment, the transaction request and response is sent for processing to middleware 302a and 302b through the secure connection.

Stale request-response engines 316a and 316b define a transaction request or response as a stale if the time during which the transaction request or response is present in the queue exceeds the time of expiry of the transaction. In a specific embodiment, the stale requests and responses are not processed by middleware 302a and 302b.

Stale request-response engines 316a and 316b further verify the validity of the transaction request and response based on the details of the transaction. For example, stale request-response engines 316a verify the validity of the transaction response based on the status of the corresponding transaction request. If the status of the transaction request is identified as stale, the transaction response is defined as stale and is not processed by middleware 302a. In a specific embodiment, if the transaction response exceeds the time of expiry associated with the transaction request, stale request-response engine 316a defines the response as a stale response, and the response is not processed by middleware 302a. In a specific embodiment, stale request-response engines 316a and 316b periodically identify the validity of the transaction requests and responses after a predefined stale period, based on the time of expiry associated with the requests and responses. In a specific embodiment, the value of the predefined stale period is less than or equal to the shortest time of expiry amongst all the times of expiry associated with transaction requests and responses.

Service availability checker 312b checks the availability of server applications 112 that serve the transaction requests. If server applications 112 are available, command engine 204b sends the transaction requests to server applications 112 for execution. Server applications 112 send transaction responses corresponding to transaction requests to request-response engine 208b. The transaction responses are thereby synchronized with middleware 302a. This is described in detail below in conjunction with FIG. 4.

In various embodiments, different elements of system 300, such as registration engines 304a and 304b, personalization engines 306a and 306b, priority engines 308a and 308b, data stores 310a and 310b, network availability checker 312a, service availability checker 312b, data security engines 314a and 314b, and stale request-response engines 316a and 316b may be implemented in the form of hardware, software, firmware, or combinations thereof.

FIG. 4 is a flowchart of a method for managing real-time execution of one or more transactions (e.g., real-time transactions). The transactions are executed between a plurality of network devices, such as network devices 102 and 106. Network devices 102 and 106 include a requesting middleware such as middleware 202a, and a server middleware such as middleware 202b, respectively.

At step 402, one or more transaction identifiers associated with the transactions are received by a middleware. In a specific embodiment, the transaction identifiers associated with the transaction requests are received by the requesting middleware. In addition, or instead, transaction identifiers associated with the transaction responses, corresponding to the transaction requests, are received by the server middleware.

At step 404, the details of the transactions are synchronized between the middleware in real-time. In a specific embodiment, the synchronization includes replicating the details, such as the state of the transaction, on the middleware in real-time. In a specific embodiment, the details of the transaction requests, from the requesting middleware, are synchronized with the server middleware for further processing. In another embodiment, the details of the transaction responses, from the server middleware, are synchronized with the requesting middleware. In various embodiments, the synchronization takes place independent of the details of the transactions.

At step 406, the transactions are processed by the middleware based on the synchronized details of the transactions. In a specific embodiment, processing includes identifying the changes in synchronized details on the middleware, such as the requesting middleware and the server middleware, in comparison with earlier synchronized details, to determine the new and updated transactions. The new and updated transactions are forwarded by the middleware to the requesting applications and server applications for execution.

Figure 5A:
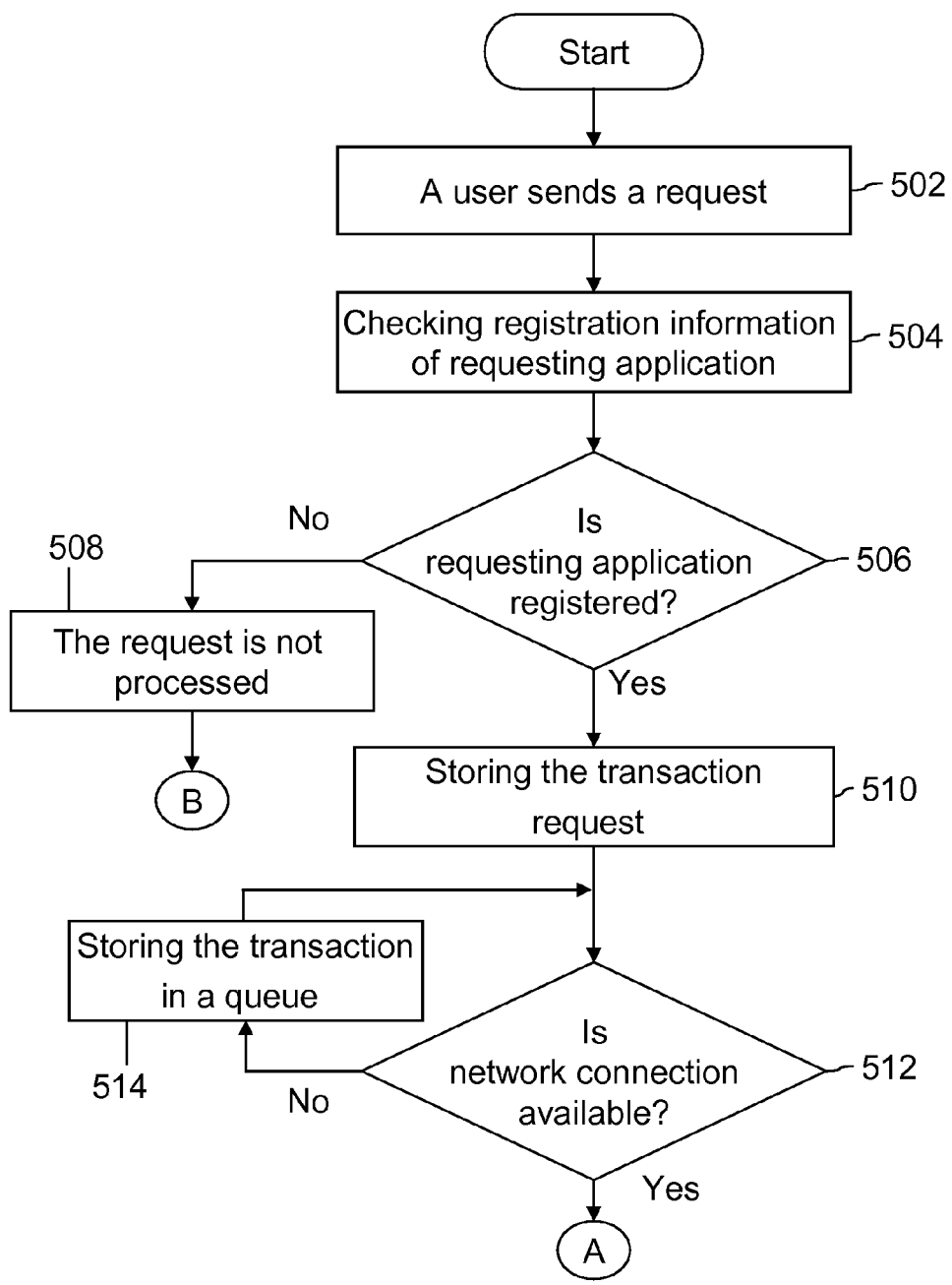
FIGS. 5a, 5b, and 5c are flowcharts for managing real-time execution of one or more transactions between a mobile device and an inventory store.
Figure 5B:
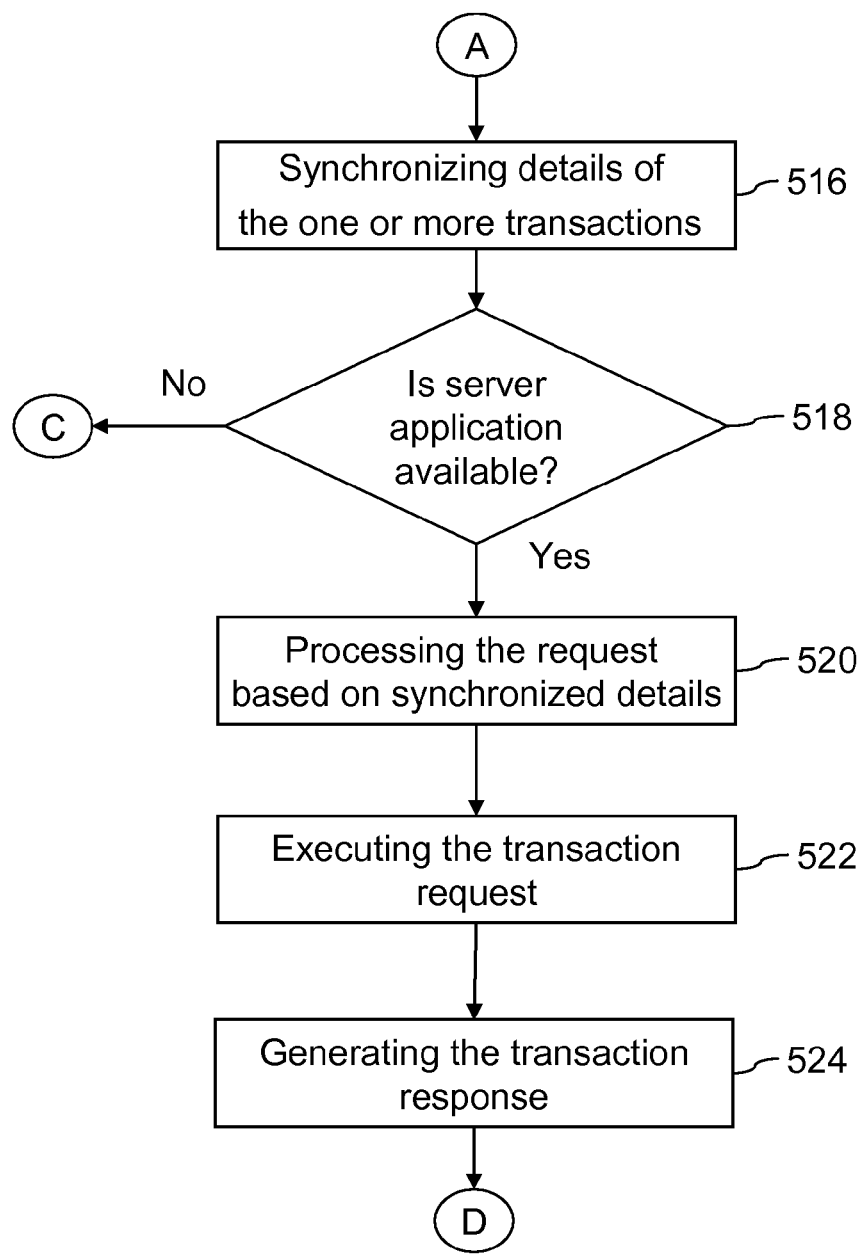
Figure 5C:
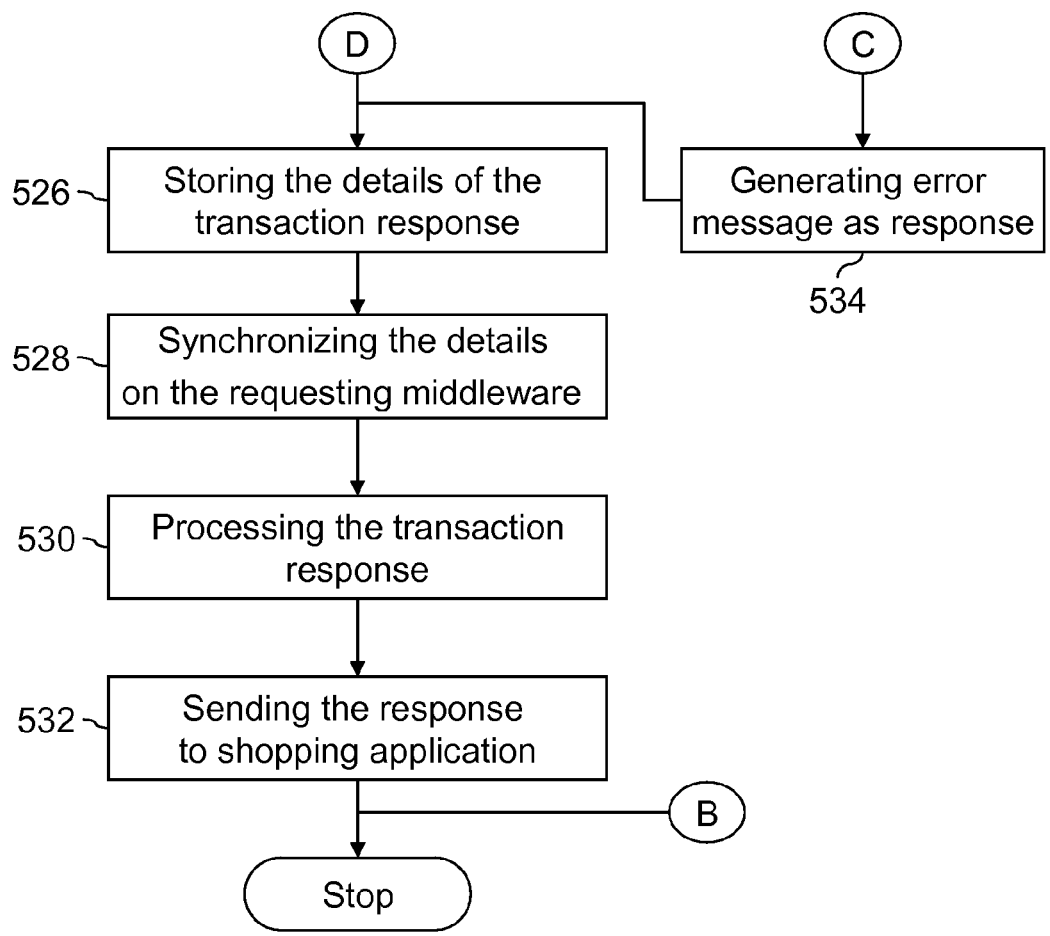

FIG. 5a, FIG. 5b, and FIG. 5c depict a flowchart of a method for managing the real-time execution of one or more transactions (e.g., real-time transactions) between a mobile device and an inventory store. At 502, a user sends a transaction request through a shopping application installed on the mobile device to buy an item (e.g., a shirt) from the inventory store. The transaction request is required to be served by a server application installed on an inventory server. The mobile device and the inventory server include a requesting middleware and a server middleware, respectively.

At 504, the requesting middleware checks the registration information pertaining to the shopping application. In various embodiments, each application installed on a network device needs to be registered with the middleware, to be able to transact with other network devices through the middleware.

At 506, it is determined if the shopping application is registered with the requesting middleware. If the shopping application is not registered, the transaction request is not processed by the requesting middleware, at 508. However, if the shopping application is registered, the details of the transaction request are stored in the requesting middleware, at 510. The details of the transaction request may include the state of the shopping application, the configuration parameters of the shopping application, the priority details, and the time of expiry of the transaction request.

In a specific embodiment, one or more requesting applications and one or more server applications are present in the mobile device and the inventory server respectively. The requesting applications and the server applications are registered with the requesting middleware and the server middleware respectively. The user may simultaneously use the requesting applications to send one or more transaction requests to the server applications. In a specific embodiment, the requesting applications and the server applications are prioritized based on the details of the transactions. The priority determines the preference of execution of these transactions.

Network connectivity availability between the mobile device and the inventory server is checked at 512. If the network connectivity is not available, the transaction request is stored in a queue, at 514. In a specific embodiment, subsequent transaction requests are also stored in the queue until network connectivity is available. In another embodiment, a transaction request is stored in the queue until its time of expiry. If the transaction request is present in the queue for longer than the time of expiry, the request is defined as a stale request and is not processed by the requesting middleware. In an alternate embodiment, the transaction requests may be terminated if network connectivity is not available.

If the network connectivity is available, the details of the transaction request are synchronized with the server middleware, at 516. In a specific embodiment, synchronization is performed by replicating the details stored on the requesting middleware with the server middleware in real-time, and vice-versa. In a specific embodiment, the details include the registration information of the applications, the state of the applications, the configuration of the applications, the state of the transactions, the priority of the transactions, and the security preference of the transactions. Replication is performed by encrypting the details based on the security preferences associated with the transaction request.

At 518, the server middleware determines the availability of the server application. In a specific embodiment, the availability of the server application is based on its registration with the server middleware. In another embodiment, the availability of the server application is checked in terms of its load and resources.

If the server application is available, at 520, the request is processed by the server middleware based on synchronized details. The processing includes identifying the changes in the synchronized details, as compared to the earlier synchronized details. The server middleware determines a new or updated transaction request based on the changes in the synchronized details. In a specific embodiment, processing includes mapping the transaction request on to the server application. At 522, the transaction request is sent to the server application for execution.

At 524, a transaction response corresponding to the transaction request is generated by the server application. At 526, the details of the transaction response are stored in the server middleware. Thereafter, at 528, the details stored on the server middleware are synchronized with the details stored on the requesting middleware. In various embodiments, 528 is performed only when the network connectivity is available between the network devices.

At 530, the requesting middleware processes the transaction response, based on synchronized details. In a specific embodiment, processing includes identifying the time period between the transaction request being sent and the transaction response being received. If the time period exceeds the time of expiry, the transaction response is defined as a stale transaction and the transaction is not considered to be a valid transaction. At 532, the transaction response is sent to the shopping application.

However, if the server application is unavailable 518, 534 is performed. At 534, an error message is generated on the server middleware as a transaction response. In a specific embodiment, the server middleware waits for the time of expiry of the transaction response, for the server application to be available. Thereafter, the process continues at 526.

Figure 6:
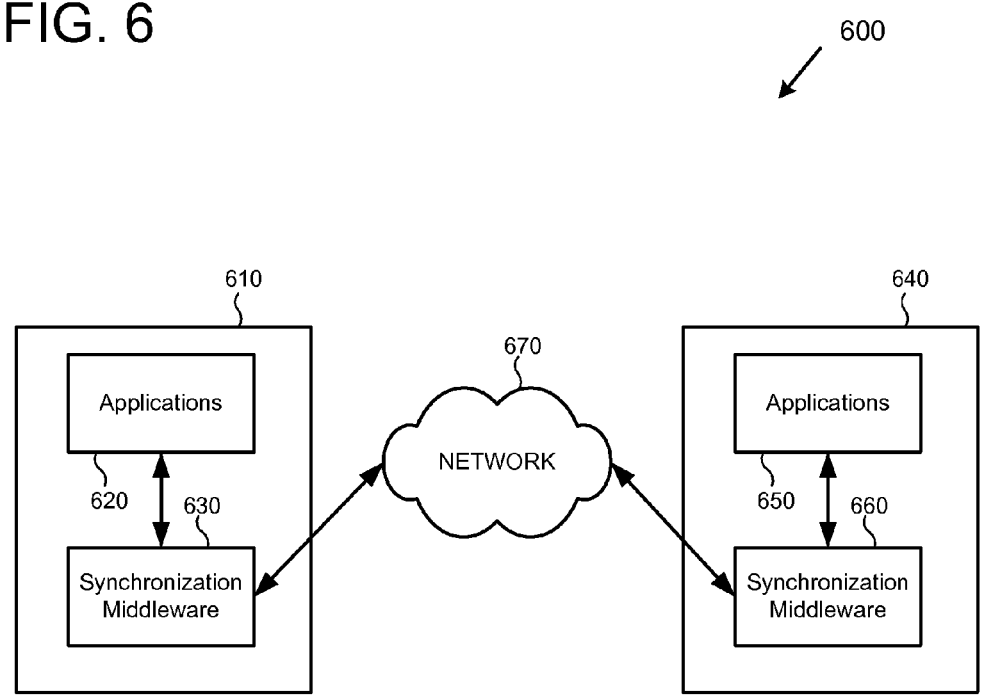
FIG. 6 is a block diagram illustrating an example architecture for managing real-time execution of transactions.

FIG. 6 is a block diagram 600 depicting an example architecture for managing real-time execution of transactions. The example diagram 600 depicts two devices, 610 and 640. For example, the devices can be mobile computing devices (e.g., mobile phones or mobile computers), computers, servers, PDAs, or the like. In a specific situation, one device (e.g., 610) can be a client device (e.g., a client mobile device) and the other device (e.g., 640) can be a computer server device. While the example diagram 600 depicts two devices, any number of devices can be present. The devices communicate over a network 670 (e.g., a wireless network, a LAN, a WAN, the Internet, or another type of network).

Each of the devices depicted in the diagram 600 comprises one or more applications (e.g., applications 620 of device 610). The applications can be client applications (e.g., shopping applications, web browsing applications, database client applications, etc.), server applications (e.g., database applications, web server applications, etc.), or any other type of application.

The applications (620 and 650) participate in real-time transactions (e.g., transactions where a real-time response is required). Instead of communicating directly (e.g., applications 620 communicating directly with applications 650), the applications communicate through synchronization middleware (630 and 660). The synchronization middleware abstracts certain transaction operations from the applications. In a specific implementation, the synchronization middleware (630 and 660) performs prioritization, security (including encryption), network communication (including handling connection problems), and transaction management (including transaction timeout or expiration situation). For example, in the event of network problems (e.g., if network 670 goes down), the synchronization middleware (630 and 660) can keep trying (e.g., keep trying to connect until the connection is restored or a timeout is reached).

The synchronization middleware (630 and 660) can accept security parameters (e.g., security preferences) from the applications (620 and 650). For example, a security parameter can specify a type (e.g., level) of security required for a transaction (e.g., that a transaction requires a secure HTTPS network connection when performing synchronization between network devices). The synchronization middleware (630 and 660) can make a determination regarding whether a network connection supports the type of security required for the transaction. For example, if the network connection does not support a security requirement (e.g., a requirement for HTTPS security), then synchronization of the transaction can be delayed (e.g., until a network connection meeting the security requirement is available or until the transaction times out). For example, synchronization middleware running on one device (e.g., synchronization middleware 630 running on device 610) can determine security capabilities (e.g., whether a server device web server application supports HTTPS security) of applications or synchronization middleware running on the other device (e.g., applications 650 or synchronization middleware 660 running on device 640), and vice-versa.

For example, one of the applications 620 on device 610 (e.g., a client device) can be a shopping application. The applications 650 on device 640 (e.g., a server device) can comprise a shopping server application and a database application. In order for the shopping application on device 610 to operate correctly, transactions must be executed in real-time (e.g., a response must be received within a short time period, such as 10 seconds, or the transaction will timeout and an error message will be displayed). Consider, for example, a user operating the shopping application. The user enters an order for a specific product (e.g., a shirt of a specific color and size). The application 620 creates a transaction (an order transaction) and conveys the transaction to the synchronization middleware 630. The synchronization middleware 630 synchronizes the transaction with the synchronization middleware 660 on the server 640. The server applications 650 receive and execute the order transaction and return a response to the synchronization middleware 660, which synchronizes the response transaction with the synchronization middleware 630. The shopping application 620 receives the response transaction (e.g., indicating a result of the order transaction). For example, the response transaction can indicate that the order was placed successfully (or, the response can indicate, for example, that the desired color and size are not available).

Using the real-time transaction architecture depicted in FIG. 6, network connectivity problems can be handled for any number of applications (e.g., 620 and 650) without the applications having to be written or modified to handle such problems. For example, the applications 620 and 650 can be modified to send transactions and transaction details to the synchronization middleware (630 and 660), which then handles network communication and other tasks.

In a specific implementation, database tables are used by the synchronization middleware to store transactions and transaction details (e.g., commands, requests, responses, and other types of data). For example, the transactions and transaction details comprise: transaction identifiers (e.g., unique transaction identifiers), security preferences (e.g., whether to use encryption), transaction expiration times, and transaction priorities. Instead of database tables, synchronization middleware can use XML files, spreadsheets, flat files, or any other type of structured data repository to store the transactions and transaction details.

Table 1 below depicts a simplified example of a table of transaction information that can be used by synchronization middleware. The transactions depicted in Table 1 can be used by synchronization middleware on a client device (e.g., synchronization middleware 630 on device 610).

TABLE 1

Example Table
Database records

Order request (transaction id: 100, application: shopping, expiration: 5 seconds, priority: high, security: none, product: 123, size: medium, color: blue)
Inventory request (transaction id: 101, application: inventory, expiration: 10 seconds, priority: medium, security: none, product: 123)

For example, synchronization middleware 630 can synchronize the records depicted in Table 1 with a corresponding database located on device 640 controlled by synchronization middleware 660. Various transaction details or parameters can be used by the synchronization middleware. For example, a transaction timeout (expiration) value can be used to time out transactions (e.g., a timeout error can be returned to the corresponding application). A time out can occur due to server load, network connection problems (e.g., if network connection 670 is down), or for other reasons. A priority parameter can be used to prioritize transactions (e.g., to synchronize higher priority transactions first). A security parameter can be used to control whether encryption is used when communicating over the network 670.

When the records of Table 1 are synchronized from synchronization middleware 630 to synchronization middleware 660, applications 650 can be alerted to the presence of new records and act accordingly (e.g., execute the order and inventory requests depicted in Table 1). Table 2 below depicts a simplified example of the resulting table located on 640.

TABLE 2

Example Table
Database records

Order request (transaction id: 100, application: shopping, expiration: 5 seconds, priority: high, security: none, product: 123, size: medium, color: blue)
Inventory request (transaction id: 101, application: inventory, expiration: 10 seconds, priority: medium, security: none, product: 123)
Order response (transaction id: 100, application: shopping, expiration: 5 seconds, priority: high, security: none, result: order successfully placed)
Inventory response (transaction id: 101, application: inventory, expiration: 10 seconds, priority: medium, security: none, product: 123, quantity: 25)

Synchronization middleware 660 can then synchronize the records depicted in Table 2 with synchronization middleware 630 (which in this case would result in the last two records being added to Table 1 located on 610). Synchronization middleware 630 would then alert applications 620 to the presence of new records, which would act accordingly (e.g., display the successful order result to the user of the shopping application and display the inventory quantity result to the user of the inventory application).

Figure 7:
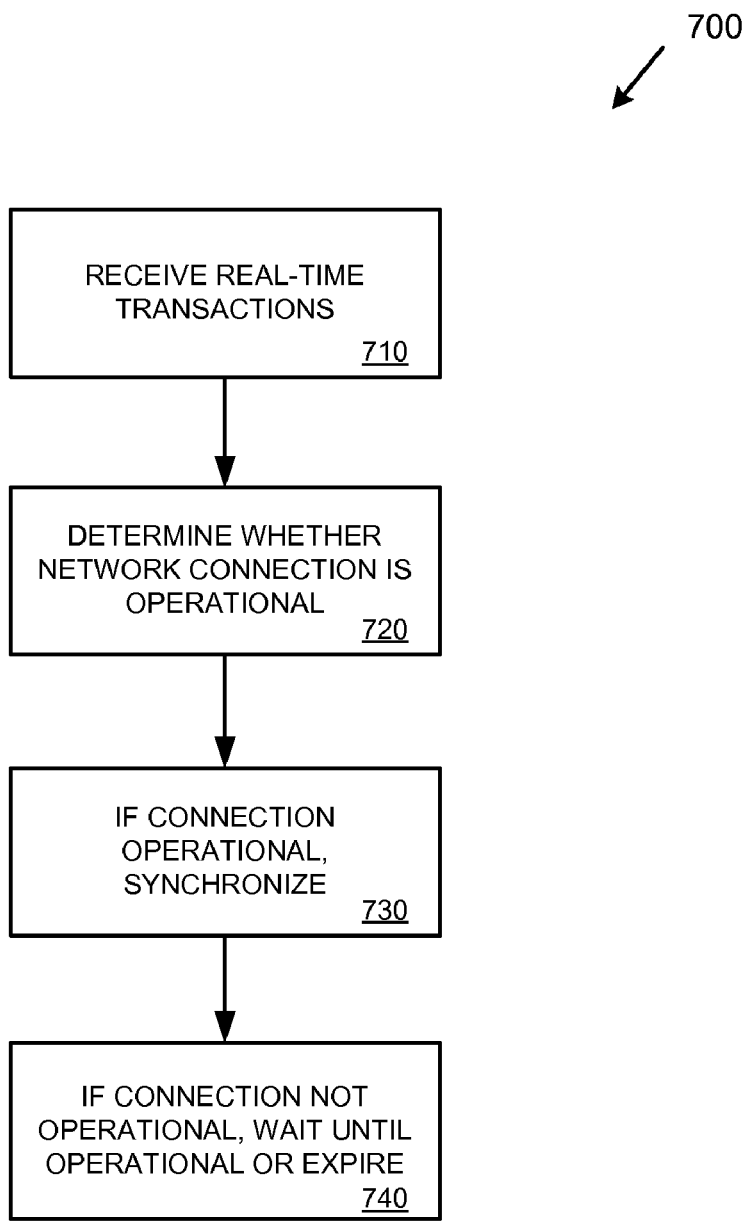
FIG. 7 is a flowchart showing an exemplary method for managing real-time execution of transactions between network devices.

FIG. 7 shows an exemplary method 700 for managing real-time execution of transactions between network devices. The method 700 can be implemented at least in part by a computing device (e.g., desktop computers, notebook computers, server computers, portable computing devices, and the like).

At 710, a plurality of real-time transactions are received by a network device from a plurality of software applications running on the network device. For example, the real-time transactions can comprise commands, requests, responses, or other types of data. The real-time transactions can comprise transaction parameters, such as transaction identifiers, application identifiers, timeout values, priorities, and/or security preferences. The real-time transactions can be received by a synchronization middleware running on the network device (e.g., received from the applications via an API of the synchronization middleware).

At 720, a determination is made whether a network connection to a second network device is operational. For example, the synchronization middleware can check a network connection to the second network device to determine whether it is operational.

At 730, if the network connection to the second network device is operational, the plurality of transactions are synchronized with the second network device (e.g., synchronized with corresponding synchronization middleware running on the second network device). For example, the synchronization can comprise synchronizing database records corresponding to the plurality of real-time transactions with the second network device. Synchronization can be bi-directional. For example, synchronization can comprise copying database records present only on the first network device to the second network device and database records present only on the second network device to the first network device.

At 740, if the network connection to the second network device is not operational, synchronization can be delayed. For example, synchronization can be delayed until the network connection becomes operational or until one or more of the transactions expire, whichever occurs first. If one or more transactions expire while waiting, corresponding applications can be notified (e.g., the applications can then display an error message). Waiting can continue for the remaining transactions that have not yet expired.

The various embodiments described herein have a number of advantages. For example, real-time execution of one or more transactions between a plurality of network devices can be managed. A secure way of completing a transaction in a network can be determined. Occasional network connectivity problems can be masked from applications. The dependence of applications on network-level security can be eliminated. Finally, the efficiency of execution of a plurality of transactions can be improved by assigning priorities to the transactions.

A system for managing real-time execution of one or more transactions between a plurality of network devices, as described herein, may be embodied in the form of a computer system. Typical examples of a computer system include a general-purpose computer, a programmed microprocessor, a micro-controller, a peripheral integrated circuit element, and other computing devices.

Different embodiments may include one or more of the inventive features shown in the following table.

| # | Feature |
|---|---|
| A1 | A computer program product for use with a computer, the computer program product comprising a computer usable medium having a computer readable program code embodied therein for managing real-time execution of one or more transactions between a plurality of network devices, the plurality of network devices having one or more requesting applications and one or more server applications, the computer readable program code performing: receiving one or more transaction identifiers for the one or more transactions, the one or more transaction identifiers being received from at least one of the plurality of network devices; synchronizing details of the one or more transactions on to at least one of the plurality of network devices using the one or more transaction identifiers; and processing the one or more transactions based on synchronized details of the one or more transactions. |
| A2 | The computer program product of A1, wherein the computer program code further performs checking availability of the one or more server applications. |
| A3 | The computer program product of A1, wherein the computer readable program code further performs prioritizing the one or more transactions based on the details of the one or more transactions. |
| A4 | The computer program product of A1, wherein the computer readable program code further performs assigning one or more security preferences to the one or more transactions. |
| A5 | The computer program product of A1, wherein the computer readable program code further performs processing the one or more transactions based on one or more time periods, the one or more time periods determining validity of the one or more transactions. |
| A6 | The computer readable program code of A1, wherein the computer readable program code further performs identifying the one or more transactions as stale transactions, if the time taken to process the one or more transactions exceeds at least one of the one or more time periods. |
| A7 | The computer program product of A1, wherein the computer readable program code further performs checking network connectivity between the plurality of network devices. |
| A8 | The computer program code of A1, wherein the computer readable program code further performs storing the details of the one or more transactions. |
| B1 | A method for managing real-time execution of one or more transactions between a plurality of network devices, the plurality of network devices having one or more requesting applications and one or more server applications, the method comprising: receiving one or more transaction identifiers for the one or more transactions, the one or more transaction identifiers being received from at least one of the plurality of network devices; synchronizing details of the one or more transactions on to at least one of the plurality of network devices using the one or more transaction identifiers; and processing the one or more transactions based on synchronized details of the one or more transactions. |
| B2 | The method of B1, wherein the one or more transaction identifiers comprise at least one of one or more transaction requests and one or more transaction responses. |
| B3 | The method of B1, wherein the one or more transaction identifiers comprise identification information of at least one of the one or more requesting applications and the one or more server applications. |
| B4 | The method of B1 further comprising checking availability of the one or more server applications. |
| B5 | The method of B1, wherein the synchronization is performed over a secure network connection between the plurality of network devices. |
| B6 | The method of B1, wherein the one or more transactions are processed based on one or more time periods, the one or more time periods determining validity of the one or more transactions. |

| # | Feature |
|---|---|
| B7 | The method of B6, wherein the one or more transactions are identified as stale transactions, if the time taken to process the one or more transactions exceeds at least one of the one or more time periods. |
| B8 | The method of B1 further comprising checking registration information of the one or more requesting applications. |
| B9 | The method of B1 further comprising prioritizing the one or more transactions based on the details of the one or more transactions. |
| B10 | The method of B1 further comprising assigning one or more security preferences to the one or more transactions. |
| B11 | The method of B1 further comprising encrypting details of the one or more transactions. |
| B12 | The method of B1 further comprising checking network connectivity between the plurality of network devices. |
| B13 | The method of B1 further comprising storing the details of the one or more transactions. |
| C1 | A system for managing real-time execution of one or more transactions between a plurality of network devices, the plurality of network devices having one or more requesting applications and one or more server applications, wherein the one or more requesting applications and the one or more server applications being registered with one or more middleware present in the plurality of network devices, each of the one or more middleware comprising: a command engine configured for receiving one or more transaction identifiers from at least one of the plurality of network devices; a synchronization engine configured for synchronizing the details of the one or more transactions on to at least one of the plurality of network devices using the one or more transaction identifiers; and a request-response engine configured for processing the one or more transactions based on synchronized details of the one or more transactions. |
| C2 | The system of C1, wherein the one or more transaction identifiers comprise at least one of one or more transaction requests and one or more transaction responses. |
| C3 | The system of C1, wherein the one or more transaction identifiers comprise identification information of at least one of the one or more requesting applications and the one or more server applications. |
| C4 | The system of C1, wherein each of the one or more middleware further comprises a registration engine, the registration engine configured for registering at least one of the one or more server applications and the one or more requesting applications on the one or more middleware. |
| C5 | The system of C1, wherein at least one of the one or more middleware further comprises a service availability checker configured for verifying availability of the one or more server applications. |
| C6 | The system of C1, wherein each of the one or more middleware further comprises a data store, the data store configured for storing the details of the one or more transactions. |
| C7 | The system of C1, wherein each of one or more middleware further comprises a personalization engine configured for providing one or more time periods for determining validity of the one or more transactions, the personalization engine further providing one or more security preferences for the one or more transactions. |
| C8 | The system of C1, wherein the request-response engine comprises a stale request-response engine configured for determining validity of the one or more transactions based on one or more time periods. |
| C9 | The system of C1, wherein each of the one or more middleware further comprises a data security engine configured for ensuring a secure connection between the plurality of network devices. |
| C10 | The system of C1, wherein each of the one or more middleware further comprises a network availability checker configured for checking the network connectivity between the plurality of network devices. |
| C11 | The system of C1, wherein the one or more middleware further comprises a priority engine configured for prioritizing the one or more transactions. |

Figure 8:
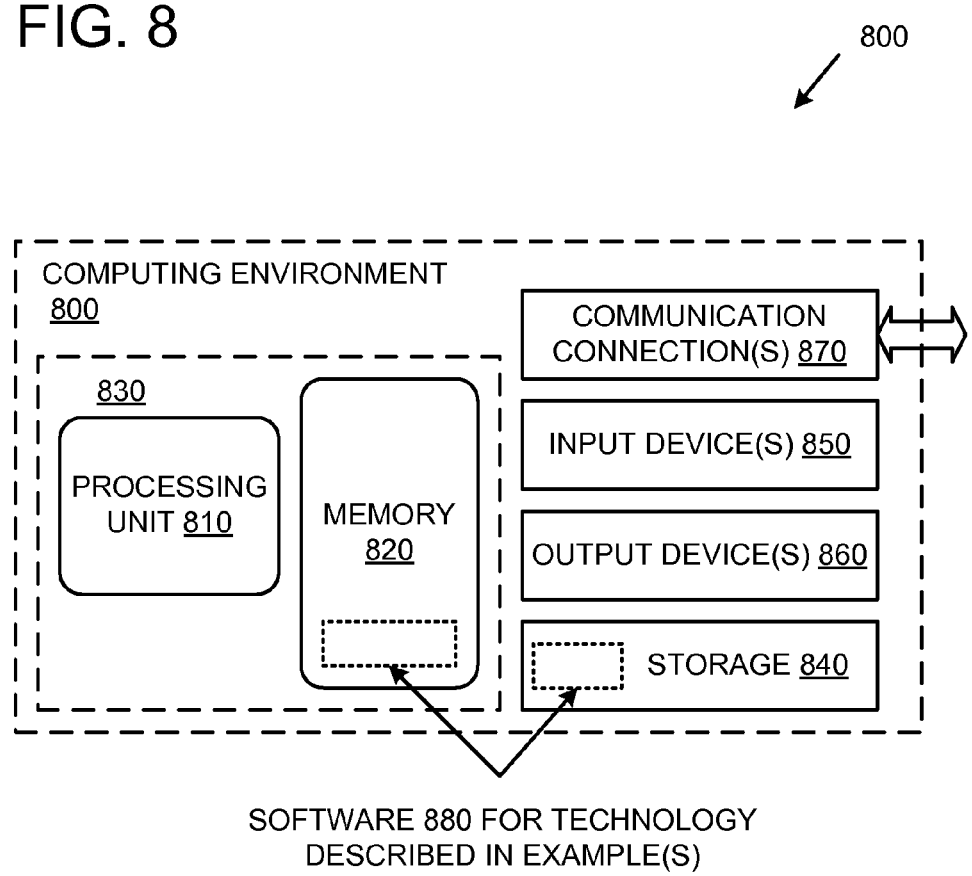
FIG. 8 is a block diagram illustrating an example of a computing environment that can be used to implement any of the technologies described herein.

FIG. 8 illustrates a generalized example of a suitable computing environment 800 in which described examples, embodiments, techniques, and technologies may be implemented. The computing environment 800 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, the computing environment 800 includes at least one central processing unit 810 and memory 820. In FIG. 8, this most basic configuration 830 is included within a dashed line. The central processing unit 810 executes computer-executable instructions and may be a real or a virtual processor. In a multi-processing system, multiple processing units execute computer-executable instructions to increase processing power and as such, multiple processors can be running simultaneously. The memory 820 may be volatile memory (e.g., registers, cache, RAM), non-volatile memory (e.g., ROM, EEPROM, flash memory, etc.), or some combination of the two. The memory 820 stores software 880 that can, for example, implement the technologies described herein. A computing environment may have additional features. For example, the computing environment 800 includes storage 840, one or more input devices 850, one or more output devices 860, and one or more communication connections 870. An interconnection mechanism (not shown) such as a bus, a controller, or a network, interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. The storage 840 stores instructions for the software 880, which can implement technologies described herein.

The input device(s) 850 may be a touch input device, such as a keyboard, keypad, mouse, pen, or trackball, a voice input device, a scanning device, or another device, that provides input to the computing environment 800. For audio, the input device(s) 850 may be a sound card or similar device that accepts audio input in analog or digital form, or a CD-ROM reader that provides audio samples to the computing environment 800. The output device(s) 860 may be a display, printer, speaker, CD-writer, or another device that provides output from the computing environment 800.

The communication connection(s) 870 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 800. By way of example, and not limitation, with the computing environment 800, computer-readable media include memory 820, storage 840, communication media (not shown), and combinations of any of the above.

Any of the methods described herein can be performed via one or more computer-readable media (e.g., storage or other tangible media) having computer-executable instructions for performing (e.g., causing a computing device or computer to perform) such methods. Operation can be fully automatic, semi-automatic, or involve manual intervention.

The technologies of any embodiments described herein can be combined with the technologies of any one or more other embodiments described herein.

In view of the many possible embodiments to which the principles of the disclosed technologies may be applied, it should be recognized that the illustrated embodiments are only preferred examples and should not be taken as limiting the scope of the technologies. Rather, the scope of the claimed technologies is defined by the following claims. We claim all that comes within the scope and spirit of these claims.

We claim:

1. A method for managing real-time execution of transactions between a plurality of network devices, the method comprising:

receiving, by a first synchronization middleware, one or more transactions from requesting applications running on a first network device of the plurality of network devices, wherein the first synchronization middleware runs on the first network device;

storing, by the first synchronization middleware on the first network device, details associated with the one or more transactions, wherein the details comprise transaction identifiers for the one or more transactions, wherein the details further comprise priority parameters and security parameters for the one or more transactions, wherein the priority parameters are based at least in part upon transaction timeout values of the one or more transactions, and wherein the security parameters indicate a type of network protocol security required for a network connection between the first network device and a second network device;

prioritizing the one or more transactions based on the priority parameters associated with the one or more transactions, wherein transactions with a higher priority are synchronized before transactions with a lower priority, and wherein the prioritizing the one or more transactions based on the priority parameters associated with the one or more transactions comprises:
assigning higher priority to those transactions with shorter transaction timeout values; and
assigning lower priority to those transactions with longer transaction timeout values; and synchronizing, by the first synchronization middleware on the first network device, the details of the one or more transactions from the first network device to a second synchronization middleware running on the second network device of the plurality of network devices, wherein the synchronization comprises checking, by the first synchronization middleware, network connectivity between the first network device and the second network device, and wherein the synchronization further comprises checking, by the first synchronization middleware, whether the network connection between the first network device and the second network device supports the type of network protocol security required by the security parameters, and wherein the synchronizing further comprises:
when the network connection between the first network device and the second network device does not support the type of network protocol security required by the security parameters, delaying the synchronizing; and
when the network connection between the first network device and the second network device does support the type of network protocol security required by the security parameters, proceeding with the synchronizing.

2. The method of claim 1 wherein the one or more transactions comprise at least one transaction request and at least one transaction response.

3. The method of claim 1 wherein the synchronization is performed over a secure network connection between the first network device and the second network device.

4. The method of claim 1 wherein the one or more transactions are processed by the second network device, and wherein the one or more transactions are identified as stale transactions if the time taken to process the one or more transactions exceeds one or more time periods associated with the one or more transactions.

5. A synchronization middleware for managing real-time execution of transactions between network devices, the middleware comprising:
a command engine configured for receiving transactions from a plurality of applications, wherein the command engine is further configured for receiving, from the plurality of applications, priority parameters and security parameters associated with the transactions, wherein the priority parameters and security parameters are used when synchronizing the details of the transactions, wherein the priority parameters are based at least in part upon transaction timeout values of the transactions, and wherein the security parameters indicate a type of network protocol security required for a network connection between a first network device and a second network device;

a priority engine configured for prioritizing the transactions based on the priority parameters associated with the transactions, wherein transactions with a higher priority are synchronized before transactions with a lower priority, and wherein the prioritizing the transactions based on the priority parameters associated with the transactions comprises:
assigning higher priority to those transactions with shorter transaction timeout values; and
assigning lower priority to those transactions with longer transaction timeout values;

a synchronization engine configured for synchronizing details of the transactions between the first network device and the second network device, wherein the synchronization engine is further configured for checking whether the network connection between the first network device and the second network device supports the type of network protocol security required by the security parameters, and wherein the synchronization engine is further configured for:
when the network connection between the first network device and the second network device does not support the type of network protocol security required by the security parameters, delaying the synchronizing; and
when the network connection between the first network device and the second network device does support the type of network protocol security required by the security parameters, proceeding with the synchronizing; and a request-response engine configured for processing the transactions, wherein the processing comprises:
checking network connectivity between the first network device and the second network device; and
determining whether the transactions have expired by checking transaction timeout values associated with the transactions.

6. The middleware of claim 5 further comprising a registration engine, the registration engine configured for registering the plurality of applications.

7. The middleware of claim 5 further comprising a service availability checker configured for delaying synchronization if the network connectivity between the first network device and the second network device is down.

8. The middleware of claim 5 further comprising a data store, the data store configured for storing the transactions.

9. The middleware of claim 5 further comprising a personalization engine configured for providing time periods for determining validity of the transactions.

10. A method for managing real-time execution of transactions between network devices, the method comprising:
receiving, by a first synchronization middleware running on a first network device from a plurality of software applications running on the first network device, a plurality of real-time transactions, wherein the plurality of real-time transactions comprise transaction parameters, wherein the transaction parameters comprise for at least one real-time transaction of the plurality of real-time transactions:
a transaction timeout value indicating a time period after which the real-time transaction expires;
a transaction identifier uniquely identifying the real-time transaction;
an application identifier indicating an application of the plurality of software applications associated with the real-time transaction;
a priority parameter indicating relative priority of the real-time transaction, wherein the real-time transaction is prioritized based on the priority parameter, wherein the priority parameter is based at least in part upon the transaction timeout value of the real-time transaction, and wherein transactions with a higher priority are synchronized before transactions with a lower priority; and
a security parameter indicating a type of network protocol security required for a network connection between the first network device and a second network device;
prioritizing the plurality of real-time transactions based on priority parameters associated with the plurality of real-time transactions, wherein transactions with a higher priority are synchronized before transactions with a lower priority, and wherein the prioritizing the plurality of real-time transactions based on the priority parameters associated with the plurality of real-time transactions comprises:
assigning higher priority to those transactions with shorter transaction timeout values; and
assigning lower priority to those transactions with longer transaction timeout values;
determining, by the first synchronization middleware, whether the network connection to the second network device is operational and whether the network connection to the second network device supports the type of network protocol security required by the security parameter;
if the network connection to the second network device is operational and supports the required type of network protocol security, synchronizing, by the first synchronization middleware, the plurality of real-time transactions with a second synchronization middleware running on the second network device; and
if the network connection to the second network device is not operational or does not support the required type of network protocol security, delaying synchronizing, by the first synchronization middleware, the plurality of real-time transactions with the second synchronization middleware running on second network device until the first of: the network connection becomes operational and supports the required type of network protocol security, or one or more of the real-time transactions expire.

11. The method of claim 10 further comprising:
after synchronizing the plurality of real-time transactions with the second network device, receiving a return synchronization from the second network device, wherein the return synchronization comprises one or more real-time transactions in response to a corresponding one or more of the plurality of real-time transactions.

12. The method of claim 10 further comprising:
determining whether one or more of the plurality of real-time transactions has expired by checking transaction timeout values associated with corresponding transactions of the plurality of real-time transactions.

* * * * *